(12) United States Patent
Hariharan et al.

(10) Patent No.: US 9,378,519 B1
(45) Date of Patent: Jun. 28, 2016

(54) COLLABORATIVE ELECTRONIC COMMERCE

(75) Inventors: Gurushyam Hariharan, Phoenix, AZ (US); Matthew T. Williams, Seattle, WA (US); Hidayet Ozgur Sanli, Tempe, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 1058 days.

(21) Appl. No.: 12/510,626

(22) Filed: Jul. 28, 2009

(51) Int. Cl.
*G06Q 30/06* (2012.01)

(52) U.S. Cl.
CPC .................. *G06Q 30/0623* (2013.01)

(58) Field of Classification Search
CPC .......................................... G06Q 30/06–30/08
USPC .................................... 705/26–27, 26.1–27.2
See application file for complete search history.

(56) References Cited

U.S. PATENT DOCUMENTS

| | | | |
|---|---|---|---|
| 6,611,814 B1 * | 8/2003 | Lee et al. | 705/26 |
| 7,062,451 B1 * | 6/2006 | Dentel et al. | 705/26 |
| 7,124,115 B1 * | 10/2006 | Herzberg et al. | 705/64 |
| 7,249,057 B2 * | 7/2007 | Hatakama et al. | 705/26 |
| 2002/0065735 A1 * | 5/2002 | Hatakama et al. | 705/26 |
| 2002/0111879 A1 * | 8/2002 | Melero et al. | 705/26 |
| 2002/0198882 A1 * | 12/2002 | Linden et al. | 707/10 |
| 2003/0083892 A1 * | 5/2003 | Ramachandran et al. | 705/1 |
| 2003/0105682 A1 * | 6/2003 | Dicker et al. | 705/27 |
| 2003/0182205 A1 * | 9/2003 | Watabe et al. | 705/26 |
| 2005/0102202 A1 * | 5/2005 | Linden et al. | 705/27 |
| 2006/0184424 A1 * | 8/2006 | Connolly et al. | 705/26 |
| 2007/0061215 A1 * | 3/2007 | Waites | 705/26 |
| 2007/0299743 A1 * | 12/2007 | Staib et al. | 705/27 |
| 2008/0052195 A1 * | 2/2008 | Roth et al. | 705/27 |
| 2008/0091546 A1 * | 4/2008 | Kirovski et al. | 705/26 |
| 2008/0172309 A1 * | 7/2008 | Reimer | 705/27 |
| 2008/0250026 A1 * | 10/2008 | Linden et al. | 707/10 |

* cited by examiner

*Primary Examiner* — Ethan D Civan
(74) *Attorney, Agent, or Firm* — Thomas | Horstemeyer, LLP

(57) ABSTRACT

Disclosed are various embodiments for collaborative electronic commerce. For example, a first network site is implemented in at least one server that sells a first plurality of items via a network. A relationship is identified in the at least one server between a second network site and an aspect of the first network site, where the second network site is configured to sell a second plurality of items via the network. A reference to the second network site is presented to the user in association with a transaction that involves the aspect of the first network site.

23 Claims, 6 Drawing Sheets

COLLABORATIVE ELECTRONIC COMMERCE

BACKGROUND

There are many different websites on the Internet that conduct electronic commerce selling just about anything. Many such websites sell a wide variety of products. Also, many of these websites may specialize in the sale of specific types of products. In some situations, the design of a given website may result in greater sales of certain products than other websites.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following discussion describes systems and methods relating to collaborative electronic commerce between network sites in the context of an online marketplace or other context according to various embodiments. In one embodiment, a customer may search for a product at a first network site. Based on data from multiple network sites obtained over time, the first network site may generate a network page in response to a search by a user that includes a reference to one or more second network sites. For the sake of convenience, first a data communications network is described, followed by a discussion of the operation of the various components of the data communications network according to various embodiments.

Figure 1:
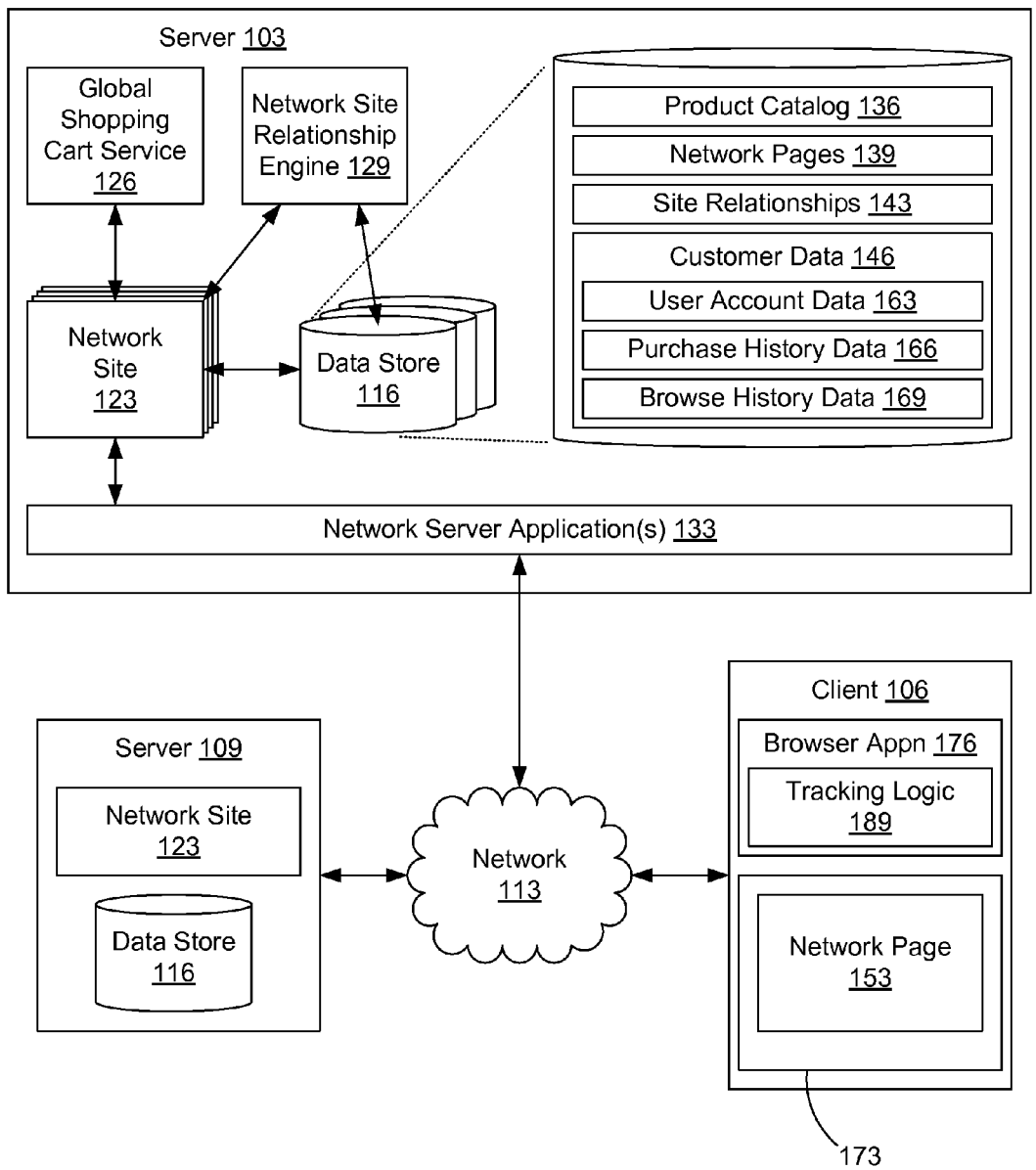
FIG. 1 is a drawing of a data communications network according to an embodiment of the present disclosure.

With reference to FIG. 1, shown is an example of a data communications network 100 that includes various computing devices such as one or more servers 103, one or more clients 106, and one or more servers 109 that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, the one or more servers 103 and 109 and the one or more clients 106 are referred to herein in the singular. However, it is understood that in one embodiment, each of the servers 103 and 109 may represent a plurality of servers, and the client 106 may represent a plurality of clients.

Each of the servers 103 and 109 comprises one example of a computing device that may be employed to execute various components as described herein. Each of the servers 103 and 109 may comprise, for example, a server computer or like system, and may represent multiple servers arranged, for example, in one or more server banks or other arrangements. Such servers may be located in a single installation or may be dispersed among many different geographical locations. To this end, each of the servers 103 and 109 may be viewed as a server "cloud" that represents the computing capacity of multiple servers, etc.

Various applications and/or engines are executed in the servers 103 and/or 109 according to various embodiments. Also, various data may be stored in one or more data stores 116 that are accessible to the servers 103 and 109, respectively. The data stored in the data stores 116, for example, may be associated with the operation of the various applications and/or engines described below. The applications executed on the server 103, for example, include one or more network sites 123, a global shopping cart service 126, a network site relationship engine 129, a network server application 133, and other applications not discuss herein.

The network server application 133 may comprise, for example, web servers or other types of network server applications 133 that provide browser access or other appropriate types of access to content and applications in the server 103 to clients 106 and the like using various protocols such as the Transmission Control Protocol/Internet Protocol (TCP/IP). To this end, the network server application 133 may comprise multiple component applications as can be appreciated.

Each of the network sites 123 is configured to conduct electronic commerce to facilitate the network presence of one or more online merchants. To this end, each of the network sites 123 may comprise one or more component applications and/or engines. Such components may be implemented on a plurality of servers 103 that are located at one site, or are distributed among geographically diverse sites as can be appreciated. The components included in the network site 123 provide for various functions such as maintaining a product catalog, searching for products, generating network pages with search results or for other purposes, effecting payment for products, and other functions. The products sold through a network site 123 may comprise, for example, goods and/or services.

To this end, the data store 116 includes, for example, a product catalog 136 in which data about products sold through a network site 123 is stored. In addition, various network page data 139, site relationships 143, and customer data 146 are stored in the data store 116. Then network page data 139 includes data that is used to create network pages 153 that are served up to a client 106. Such network pages 153 may be static or created dynamically.

The site relationships 143 include data that indicates relationships between a product, category of products, brand, or other data associated with a first network site 123, and one or more second network sites 123 as will be described. To describe a bit further, a site relationship 143 may be identified, for example, between a product offered on a first network site 123 and a second network site 123 itself by virtue of the fact that users that view or purchase the product offered on a first network site 123 also view products on a given second network site 123.

To this end, some of the network sites 123 may sell specific types of products and may present network pages 153 that are designed to accord with the products sold. For example, a given network site 123 may specialize in the sale of specific products such as video games, furniture, electronics, or other specialty. Given that such network sites 123 are specifically designed with a limited product selection in mind, it may be more likely that such network sites 123 will be successful in selling the specific products as compared to network sites 123 that sell a broad selection of products. According one embodiment, the customer data 146 includes data involving the transactions of users with multiple ones of the network sites 123. For example, the server 103 may be operated by a single entity that facilitates an electronic marketplace of multiple different network sites 123. Such an entity can examine the purchase history data 166 and browse history data 169 from multiple network sites 123 to identify site relationships 143. A site relationship 143 may comprise, for example, the fact that customers who view product X on one network site 123 typically view a second network site 123 during the same session. Also, based on the customer data 146, it may be determined that customers may be more likely to purchase product X when it viewed on a second network site 123 as opposed to a first network site 123.

In some situations, each of the network sites 123 may be operated by a single entity. This entity can provide for a global shopping cart service 126 that is employed when visiting the several different network sites 123 and purchases can be made from several different network sites 123 at the same time using the same shopping cart and checkout process. In other situations, shopping carts may be associated with each individual network site 123, where the customer data 146 is stored in a central data store 116. The site relationships 143 may be stored in a table or other data structure.

The customer data 146 includes user account data 163, purchase history data 166, and browse history data 169. As will be described, the customer data 146 may be examined to identify the site relationships 143 mentioned above.

The client 106 is representative of a plurality of client devices that may be coupled to the network 113. For example, the client 106 may comprise one of millions of clients 106 coupled to the Internet. The client 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability.

The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 106 are various applications including a browser application 176. The client browser application 176 is configured to interact with the network sites 123 and potentially other applications on the server 103 through the network server application 133 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other application with like capability. When executed in the client 106, the browser application 176 renders network pages 153 on the display device 173.

One or more network sites 123 may also be executed on the server 109 separate from the server 103. Similarly, one or more data stores 116 may also be associated with such network sites 123 on the server 109. In one embodiment, the network site 123 implemented on the server 109 may be configured to communicate the network transaction data to the server 103 to provide further information from which site relationships 143 may be discovered. In one embodiment, customer identification data or other customer designations may be communicated to the server 103 along with the network transaction data so that the behavior of individual customers in visiting network sites 123 on the respective servers 103 or 109 can be traced to identify site relationships 143 as described above.

In addition, in one embodiment, tracking logic 189 may be associated with the browser application 176 in the client 106 that reports the behavior of a given customer in visiting various network sites 123. The tracking logic 189 may comprise, for example, a plug-in or other component. By virtue of the operation of the tracking logic 189, in one embodiment the products viewed, network sites 123 visited, and products purchased can be reported to the server 103.

Thus, the ultimate customer data 146 from which site relationships 143 are determined can be generated by network sites 123 operated or hosted on the respective servers 103 or 109 or received from clients 106.

As described above, various customer data 146 is stored in one or more data stores 116 on the server 103. Such information includes purchase history data 166, browse history data 169, and other data associated with respective customers. The purchase history data 166 details the purchases made by users through various network sites 123. The browse history data 169 details the behavior of users in viewing various products and searching for various products during sessions on one or more network sites 123. In addition, it is understood that purchase history data 166 and browse history data 169 may be obtained from network sites 123 executed on the server 109 as described above. Also, such data may be received from the tracking logic 189 on the client 106.

In order to determine the site relationships 143, in one embodiment, the user account data 163 is associated with the purchase history data 166 and the browse history data 169 so that the behavior of a given customer may be examined from among multiple network sites 123. Stated another way, regardless of where the customer data 146 is obtained, a customer should be associated with such data in some manner so that relationships can be determined based on the behavior of a single customer. Specifically, once a customer is associated with all purchase history data 166 and browse history data 169, regardless of the origin of such data, then the behavior of the customer can be traced during various sessions in order to identify potential affinities between various aspects of a first one of the network sites 123 and a second one of the network sites 123. Ultimately, the site relationships 143 are identified based on the common behavior of multiple customers. In one embodiment, a site relationship 143 is identified based on the common behavior of a threshold number of customers.

Given that all of the customer data 146 is stored in the one or more data stores 116 accessible to the server 103, the network site relationship engine 129 is executed in order to identify site relationships 143. According to various embodiments, the site relationships 143 generally comprise an affinity between some aspect of a first one of the network sites 123, and a second one of the network sites 123. The aspect of the first one of the network sites 123 may comprise, for example, a product offered for sale by the first one of the network sites 123, categories of products defined on the first one of the network sites 123, brands of products sold on the first one of the network sites 123, or other aspect.

For example, one relationship might be that customers who have purchased or viewed item X on a first one of the network sites 123 also have contemporaneously visited a given second one of the network sites 123. In this respect, the term "contemporaneously" may mean that the actions took place during the same session or within a short period of time relative to each other. If a threshold number of customers engage in this specific browsing activity, then it may be deemed that there is a relationship between the item X and the second one of the network sites 123.

In another example, a relationship might be that customers who view a product category associated with a first one of the network sites 123 also contemporaneously visit a second one of the network sites 123. A product category may be viewed by browsing a network page 153 for a product category that lists products falling under a specific category for a given one of the network sites 123. If a threshold number of customers engage in this specific browsing activity, then it may be deemed that there is a relationship between the second one of the network pages 123 and a category associated with the first one of the network pages 123.

In still another example, a relationship might be that a brand name or other term used in a search on a first one of the network sites 123 is associated with one or more second network sites 123, for example, that may specialize in such a brand or products. For example, assume that the brand name "WIDGETS" was included in a search string of a search performed through a first one of the network sites 123. Also, assume that a second one of the network sites 123 is a specialized boutique that specifically sells WIDGETS brand products. Accordingly, a site relationship 143 may exist between the brand and the second one of the network sites 123.

In addition, a relationship may exist between a given product and a given network site 123 by virtue of a relatively high conversion rate for the product on the respective network site 123. To this end, one may identify conversion rates for specific products on different network sites 123 to identify those network sites 123 with the greatest probability of conversion for a given product. To this end, it is presumed that a conversion rate may be attributable to the nature of the network site 123 itself. The concept of conversion as contemplated herein may encompass the actual purchase of a product viewed, clicking through an advertisement or other reference, clicking through a link, or some other behavior.

Still further, a relationship may exist between a product offered by a first network site 123 and a second network site 123 by virtue of the fact that the product is related in some way to one or more products available on the second network site 123. Such a relationship may comprise, for example, a complementary relationship, a comparison relationship, or other type of relationship. A complementary relationship is one in which products are not competing products, but are related to each other in some way such that it makes sense to purchase both. In this sense, one product may be needed in order to use the other product, or one product may provide help in using the other product. For example, a complementary relationship may exist where an electronic device offered for sale on a first network site 123 is compatible with a power cord offered on a second network site 123. A complementary relationship may exist where a device is offered for sale on a first network site 123 and a book that explains how to use the device is offered for sale on a second network site 123. Also, a complementary relationship may exist where two or more items have a purchase affinity with each other even in cases where no other apparent relationship exists. For example, it just may be the case that customers who purchase product X also purchase product Y. A comparison relationship may exist where a second network site 123 offers devices that are alternatives to a device offered for sale of a first network site 123. Such comparative products may be like products offered by competitors.

In addition, various data mining techniques may be employed to identify relationships between various items. For example, affiliations between products may be determined based on the behavior of customers as set forth by the customer data 146. Specifically, it may be determined that a predefined percentage of customers who purchase item X also purchase item Y. If this predefined percentage is significant, than it may be assumed that a relationship exists between items X and Y. In addition, there may be many other approaches that can be employed to determine relationships between products.

In addition, there may be many other types of relationships between transactions or other aspects of the operation of a first network site 123 and a second network site 123 beyond those described above.

Once the network site relationship engine 129 identifies specific site relationships 143, they may be stored in one or more data stores 116. In one embodiment, each network site 123 may include its own set of site relationships 143 with respect to other network sites 123. Thus, the site relationships 143 may be specifically generated for a given network website 123 relative to other network sites 123.

According to various embodiments, each of the network sites 123 generates various types of network pages 153 in accordance with the electronic commerce they facilitate. Such different network pages 153 may include, for example, network page 153 that specifically set forth the details associated with a given product. Such a network page 153 often gives a customer an opportunity to select such a product for inclusion within a shopping cart.

Another type of network page 153 that may be generated by a network site 123 may include a network page 153 that sets forth a product category. Such a network page 153 operates to limit the number of products viewed by a customer to those that fall within a given category. The category may be defined by the network site 123 itself. A network page 153 depicting a product category might be associated with a link on a home page and may be selected in an effort to narrow down the products viewed by a customer to those products falling within a given category. Other types of network pages 153 include a product search page that lists the results of a product search performed by a customer on a network site 123. In one embodiment, the search terms employed may be relevant to other network sites 123 as will be described. In addition, there may be many other types of network pages 153 generated by respective network sites 123.

According to one embodiment, a first one of the network sites 123 is configured to present a reference to one or more second network sites 123 to a user in association with a transaction that involves an aspect of the first network site 123. For example, the transaction that involves the aspect of the first network site 123 may comprise an action that relates to a given product such as, for example, viewing a product, placing a product in a shopping cart, purchasing a product, or other behavior. Alternatively, the transaction may involve viewing a category page where the aspect of the network site 123 comprises the category viewed.

Thus, the transaction performed may comprise generating a product detail page for a respective product. Also, the transaction with the first network site 123 may comprise generating a network page 153 depicting a category associated with a category of products. Still further, the transaction may involve generating a network page 153 that presents a result of a search of the products in a product catalog 136 based upon a search string that identifies a brand or other concept. To this end, the product, category, or brand comprise an aspect of the first network site 123 with which there may be a relationship with a second network site 123.

According to various embodiments, a given network site 123 may include a reference to a second one of the network sites 123 in association with a given transaction. To this end, the reference to a second network site 123 may be included in network pages 153 that present product details, a product category, a search result, or other types of network pages 153 generated by a first network site 123. According to one embodiment, the references included within a network page 153 generated by a first one of the network sites 123 comprises a link that directs a client 106 to a second one of the network sites 123. The second one of the network sites 123 to which a link is directed may be one of those network sites 123 identified in the site relationships 143 for a first one of the network sites 123.

Assuming that a user manipulates such a link, a function may be associated with the respective network page 153 that forwards information about the aspect of the first network site 123 to the second network site 123. For example, if one is viewing a network page 153 that presents product details and that has a link referring to a second network site 123, in one embodiment, manipulating such a link causes the function associated with such a network page 153 to forward information about the product viewed to the second network site 123 so as to allow the second network site 123 to automatically perform a search based upon such a product. This allows the second network site 123 to present useful results to a customer who is directed to such second network site 123 from the first network site 123.

Figure 2:
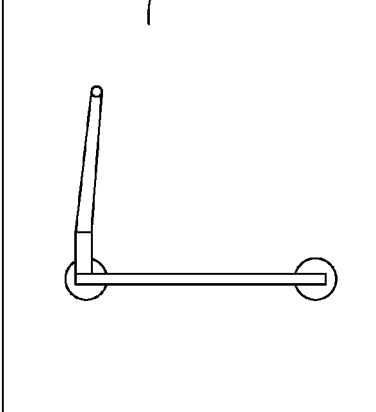
FIG. 2 is a drawing of one example of a product detail page generated by a network site implemented in a server in the data communications network of FIG. 1 according to an embodiment of the present disclosure.

With reference to FIG. 2, shown is one example of a network page 153 (FIG. 1) that comprises a product detail network page 153a. The product detail network page 153a may be generated by a respective one of the network sites 123 (FIG. 1) in response to a request such as a browser request from a given client 106 (FIG. 1).

The product detail network page 153a includes information about a product 203 that a customer may wish to purchase. To this end, the information about the product 203 may include an image 206 and a corresponding description. In addition, the product detail network page 153a depicts references 209 to other network sites 123. The spaces in the product detail network page 153a or any other network page 153 described herein may be specified by a merchant as part of their network site 123 to be used to present the references 209.

The product detail network page 153a allows a user to select a product 203 for purchase by adding the product 203 to a shopping cart, etc. The product detail network page 153a also allows a user to manipulate one of the references 209 in order to be directed to an alternate network site 123. Such an alternate network site 123 may be affiliated, for example, with the product 203 depicted in the product detail network page 153a as described above. To this end, each of the references 209 may comprise, for example, a link to a second one of the network sites 123 as described above. Although a given network site 123 may lose the sale of a product 203 if a user clicks on one of the references 209 and is directed to another network site 123 where the customer ultimately makes a purchase, it may be the case that such network sites 123 are owned by the same entity or participate in a revenue sharing arrangement as can be appreciated.

Figure 3:
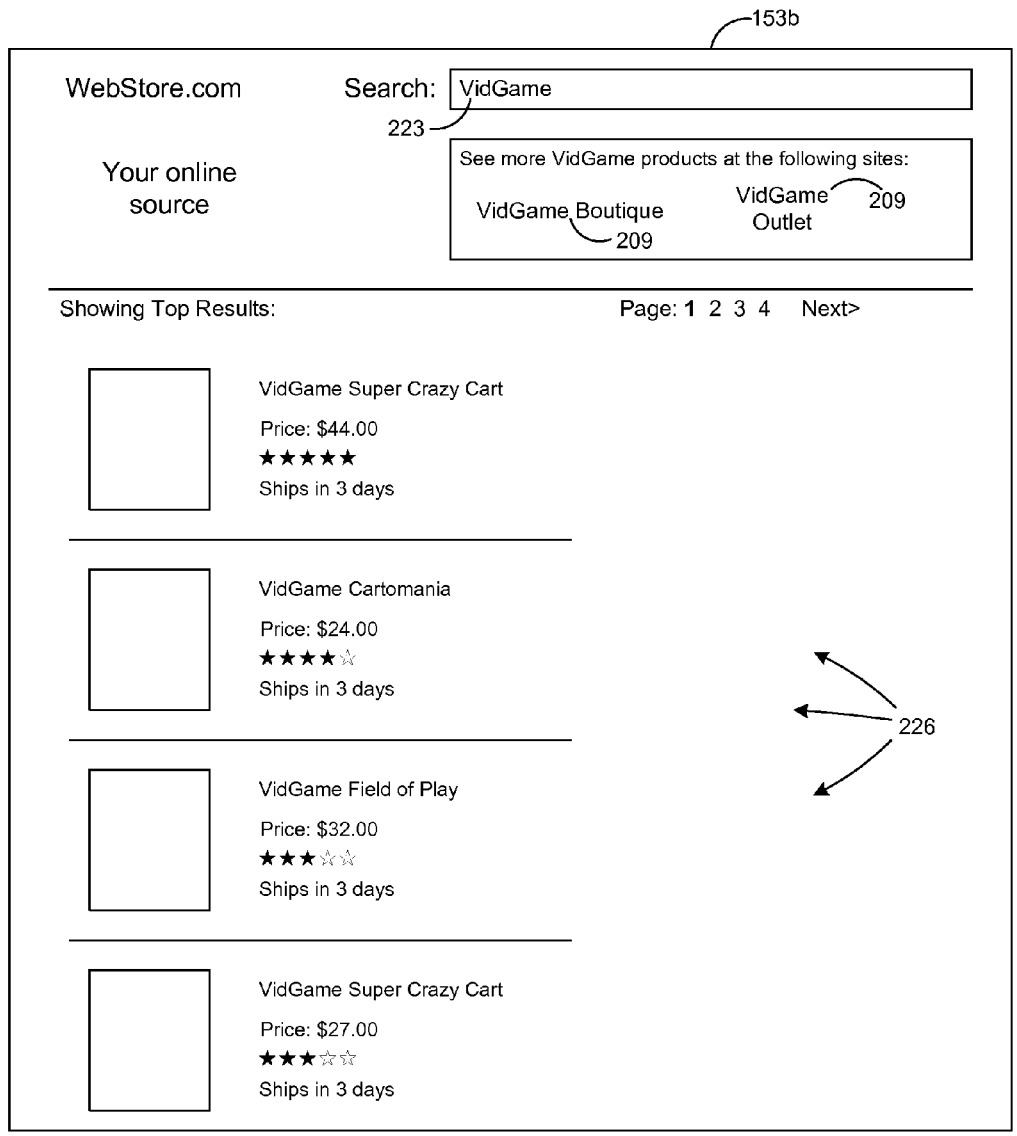
FIG. 3 is a drawing of one example of a search result page generated by a network site implemented in a server in the data communications network of FIG. 1 according to an embodiment of the present disclosure.

With reference to FIG. 3, shown is a second network page 153 (FIG. 1) that comprises a search result network page 153b according to an embodiment of the present disclosure. The search result network page 153b is generated by a network site 123 (FIG. 1) in response to a search performed by a customer on the network site 123. To this end, a customer may enter a search string 223 that is used to search for products 203 (FIG. 2) in the product catalog 136 (FIG. 1) associated with a given network site 123.

The search result network page 153b presents search results 226 that list various products 203 from the product catalog 136 that are responsive or relevant to the search string 223. From time to time, a user may enter a brand name or other search term that is directly relevant to one or more other network sites 123. Such relevance may be noted in the site relationships 143 for the respective network site 123.

As shown in FIG. 3, for example, the term "VidGame" is a brand name entered as a search string 223 for video games. Upon examining the product catalog 136 for products 203 that are responsive to the search string 223 entered, a given network site 123 may also consult its associated site relationships 143 (FIG. 1) to identify whether there are any other network sites 123 that are associated with the search string 223. Specifically, given that the brand name "VidGame" was entered as at least part of the search string 223, it may be that various network sites 123 are noted in the site relationships 143 as being specifically associated with the brand name entered. According to various embodiments, a reference 209 to such other network sites 123 may be displayed on the search result network page 153b. Such references 209 may comprise links to such other network sites 123.

In addition, associated with the search result network page 153b is functionality that transfers the search string 223 to the respective network site 123 associated with one of the references 209 when a user clicks upon or otherwise manipulates a reference 209. This causes the search string 223 to be sent to the network site 123 that can automatically perform a search based upon the search string 223 and present results to the customer. In addition, the functionality associated with the search result network page 153b may transfer other information to the respective network site 123 associated with the one of the references 209 such as customer information and data describing the current session of the customer. Such data may indicate the products viewed and other information associated with the session so that the respective network site 123 can take the prior activity of the customer in interacting with a prior network site 123 into account when generating an initial network page 153 to be viewed by the customer upon landing at the second network site 123.

Figure 4:
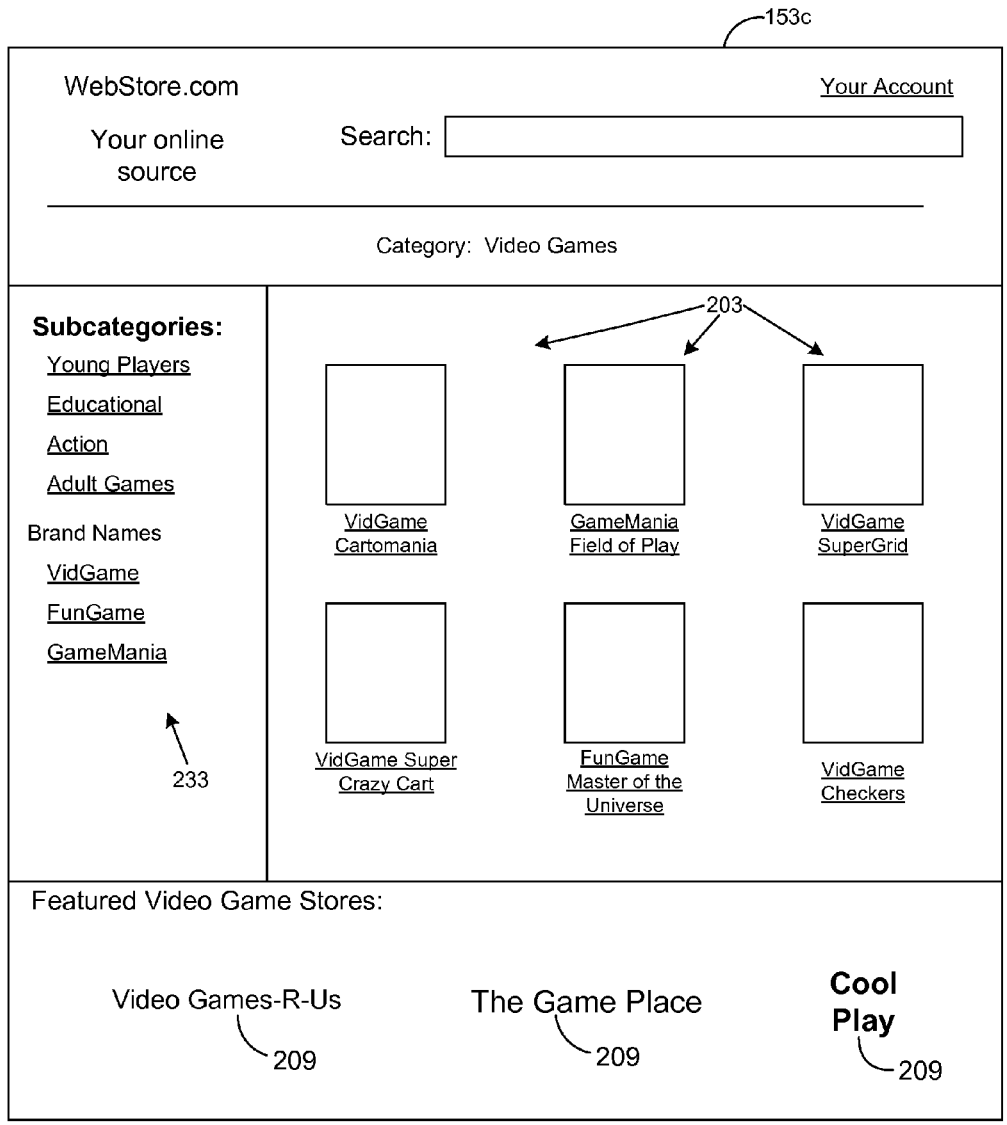
FIG. 4 is a drawing of one example of a category page generated by a network site implemented in a server in the data communications network of FIG. 1 according to an embodiment of the present disclosure.

With reference to FIG. 4, shown is a category network page 153c according to an embodiment of the present disclosure. The category network page 153c specifically lists a plurality of sample products 203 (FIG. 2) that are associated with a given category defined by a respective network site 123 (FIG. 1). To this end, the user may have selected a link associated with the category in a home page, for example, of a respective one of the network sites 123. The category network page 153*c* may include a plurality of subcategories 233 that may be manipulated to further limit the number of products 203 viewed by a customer on the client 106 (FIG. 1). In one embodiment, the category network page 153*c* is hard coded and lists a number of sample products 203 that fall within the category depicted.

The sample products 203 may comprise, for example, the top sellers among the products 203 falling within the category associated with the category network page 153*c*. In addition, a number of references 209 (FIG. 2) to other network sites 123 are depicted in the category network page 153*c*. Such network sites 123 indicated by the references 209 may be network sites 123 that have a relationship with the category associated with the category network page 153*c*. To this end, when a given network site 123 generates the category network page 153*c*, the same consults the site relationships 143 (FIG. 1) to indicate which other network sites 123 are most closely affiliated with the category associated with the category network page 153*c*. Thereafter, references 209 to such network sites 123 are included in the category network page 153*c*.

Figure 5:
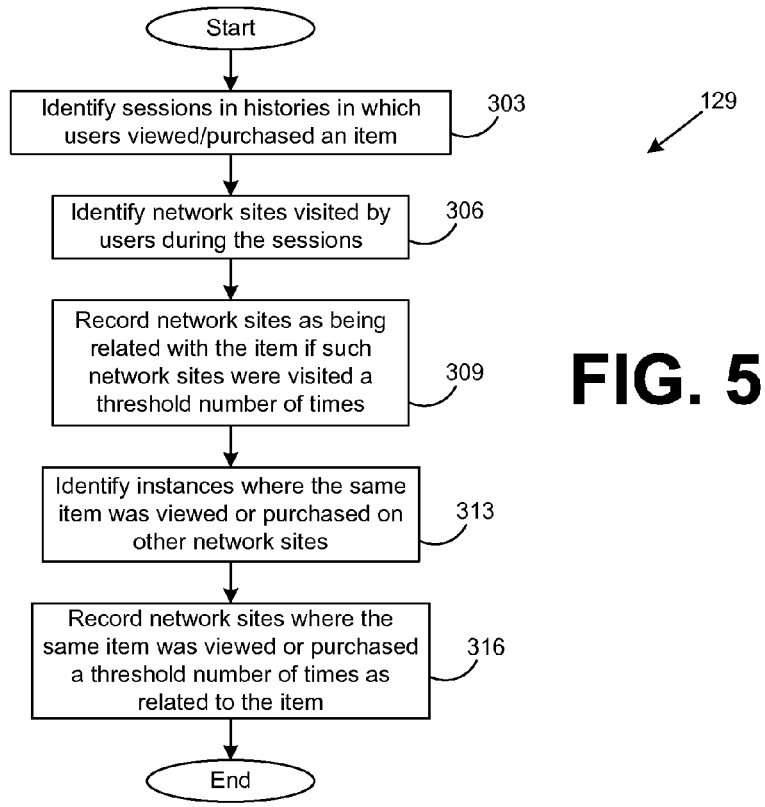
FIG. 5 is a flowchart that illustrates example functionality of a network site relationship engine implemented in a server in the data communications network of FIG. 1 according to an embodiment of the present disclosure.

Referring next to FIG. 5, shown is a flowchart that provides one example of the operation of portions of the network site relationship engine 129 (FIG. 1) according to an embodiment of the present disclosure. Alternatively, the flowchart of FIG. 5 may be viewed as depicting steps of an example of a method implemented in the server 103 (FIG. 1) in order to identify relationships between a product 203 (FIG. 1) viewed or purchased on one network site 123 (FIG. 1) and other network sites 123.

The functionality depicted in FIG. 5 shows one example of a portion of the functionality of a network site relationship engine 129 in identifying relationships between an aspect of a given network site 123 and other network sites 123. In this embodiment, the types of relationships detected include a relationship between a product 203 offered on one network site 123 and a second network site 123. This may be determined by identifying whether a customer viewed or purchased a product 203 on one network site 123 and visited the second network site 123 in the same session. This may also be determined by identifying whether the same product 203 viewed on one network site 123 is relatively frequently viewed above a threshold number of times on one or more other network sites 123. In addition, it is understood that there may be other approaches for identifying relationships including those described above.

To begin, in box 303, the network site relationship engine 129 identifies sessions in browse history data 169 (FIG. 1) and purchase history data 166 (FIG. 1) in which customers viewed or purchased a product 203. Thereafter, in box 306, the network site relationship engine 129 identifies network sites 123 that were visited by such customers contemporaneously (i.e., during the sessions or within a relatively short period of time) with the time in which products 203 were viewed or purchased on a given one of the network sites 123. Thereafter, in box 309, the network site relationship engine 129 records the visited network sites 123 as being affiliated with the product 203 if such network sites 123 were visited a threshold number of times by a threshold number of customers.

Thereafter, in box 313, the network site relationship engine 129 further identifies instances where the same product 203 was viewed or purchased on other network sites 123. Thereafter, in box 316, the network site relationship engine 129 records such network sites 123 where the same product 203 is viewed or purchased at least a threshold number of times. In this respect, a relationship between a product 203 and a network site 123 is identified ultimately if the product 203 has been viewed or purchased on a given network site 123 a predefined number of times. By correlating the behavior of at least a threshold number of customers as mentioned above, relationships can be reliably identified between products 203 or other aspects of a network site 123 and other network sites 123 due to the repeated action of customers. Thereafter, the network site relationship engine 129 ends as shown.

In addition, the network site relationship engine 129 may be configured to mine the purchase history data 166 and the browser history data 169 for other types of relationships as described above.

Figure 6:
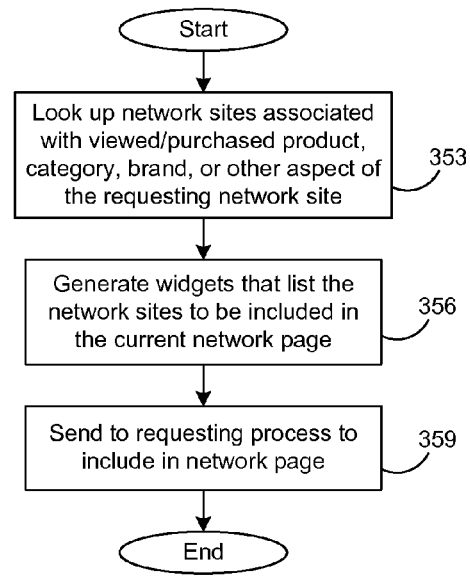
FIG. 6 is a flowchart that illustrates example functionality of a network site implemented in a server in the data communications network of FIG. 1 according to an embodiment of the present disclosure.

With reference to FIG. 6, shown is a flowchart that provides one example of the operation of a further portion of the network site relationship engine 129 according to an embodiment of the present disclosure. Alternatively, the flowchart of FIG. 6 may be viewed as depicting steps of an example of a method implemented in the server 103 (FIG. 1) in order to provide references 209 (FIG. 2) to a requesting network site 123 (FIG. 1) based on site relationships 143 (FIG. 1) to be included in various network pages 153 (FIG. 1) generated by the requesting network site 123.

The flowchart of FIG. 6 provides one example of functionality of the network site relationship engine 129 in responding to a request from a network site 123 for references 209 to be included in a network page 153 generated by the requesting network site 123. It is assumed that a user is browsing through the various network pages 153 of a network site 123. The user may conduct various transactions with respect to a network site 123 including the download and viewing of a product detail network page 153*a* (FIG. 2), a search result network page 153*b* (FIG. 3), a category network page 153*c* (FIG. 4) or other type of network page 153. In such case, the network site 123 that is generating the given network page 153 sends a request to the network site relationship engine 129 for those references 209 to include in such network page 153 based at least in part upon the respective aspect of the network site 123 involved and depending upon the specific transaction.

In response, in box 353, the network site relationship engine 129 looks up all network sites 123 that are associated with a currently viewed or purchased product 203, category, brand, or other aspect of the requesting network site 123. Thereafter, in box 356, the network site relationship engine 129 generates a widget or other component that lists references 209 to one or more network sites 123 to be included in the current network page 153 that is being generated by the requesting network site 123. Thereafter, in box 359, the references 209 are sent to the requesting network site 123 to include in a respective network page 153. In addition, any functionality associated with the manipulation of a reference 209 such as functionality that passes on search terms to another network site 123 referenced is included in the widget or other component that embodies the references 209 to be incorporated into a network page 153. Thereafter, this portion of the network site relationship engine 129 ends as shown.

In addition, it is understood that in one embodiment the network site relationship engine 129 records all relationships with the site relationships 143 stored in a data store 116 (FIG. 1) to be accessed as requested by respective network sites 123. Alternatively, relationships may be determined on the fly directly from the customer data 146 (FIG. 1) as customers browse through various network pages 153 associated with one or more network sites 123. However, it is understood that the speed at which network pages 153 need to be created by respective network sites 123 may make such an alternative less desirable until improvements in processor speed allow such relationships to be generated within acceptable time periods. Thus, recording the site relationships 143 in the data store 116 may facilitate a faster response time as can be appreciated.

Figure 7:
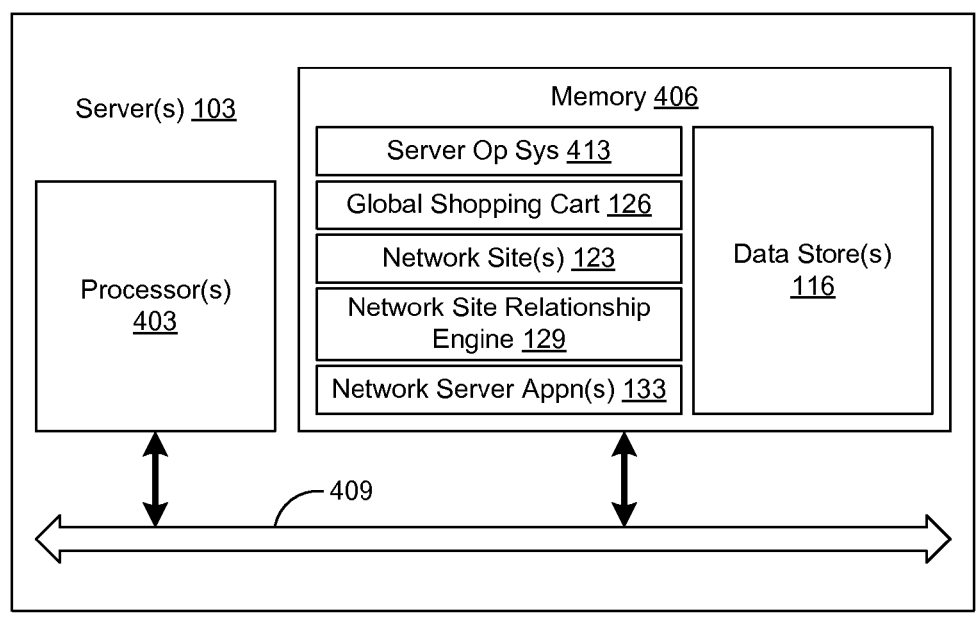
FIG. 7 is a schematic block diagram that provides one example of a server in the data communications network of FIG. 1 according to an embodiment of the present disclosure.

Referring next to FIG. 7, shown is a schematic block diagram of one example of the server 103 according to an embodiment of the present disclosure. The server 103 includes at least one processor circuit, for example, having a processor 403 and a memory 406, both of which are coupled to a local interface 409. To this end, the server 103 may comprise, for example, a server computer or like device. The local interface 409 may comprise, for example, a data bus with an accompanying address/control bus or other bus structure as can be appreciated.

Stored in the memory 406 are both data and several components and/or applications/engines that are executable by the processor 403. In particular, stored in the memory 406 and executable by the processor 403 are a server operating system 413, the global shopping cart service 126, network sites 123, network site relationship engine 129, the network server application(s) 133, and potentially other applications.

Also, stored in the memory 406 is the data store 116 in which is stored the various data items described above so as to be accessible to the processor 403. It is understood that there may be other applications that are stored in the memory 406 and are executable by the processor 403 as can be appreciated. Also, other data may be stored in the memory 406 and accessed by the processors 403 beyond the data items described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various applications and engines described above may be implemented using any one or more of a number of programming languages such as, for example, C, C++, C#, Visual Basic, VBScript, Java, JavaScript, Perl, Ruby, Python, Flash, or other programming languages.

Although the various applications and engines described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-6 show the functionality and operation of an implementation of the various applications and engines described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and engines described herein comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
    implementing a first network site in at least one server that sells a first plurality of items via a network;
    identifying a relationship in the at least one server between a second network site and one of the items sold by the first network site by making a determination whether a threshold number of users have viewed or purchased the one of the items contemporaneously with visiting the second network site, wherein the second network site is configured to sell a second plurality of items via the network, and wherein the determination is made by identifying whether the threshold number of users viewed or purchase the one of the items and visited the second network site within a single session associated with each of the users;
    generating a network page in the first network site in association with at least one of the items in response to a request from a client;
    presenting a reference to the second network site to a user in association with the network page, wherein the reference further comprises a link that directs a client device to the second network site; and
    associating a function with the network page that forwards information about the at least one of the items to the second network site upon a manipulation of the link by the user.

2. A system, comprising:
    at least one server;
    a first network site implemented on the at least one server configured to sell a first plurality of items via a network;
    a relationship engine implemented on the at least one server that identifies a relationship between a second network site and an aspect of the first network site by determining whether a threshold number of users for which user activity is tracked in a respective session contemporaneously view one of the first plurality of items and visit the second network site, the second network site being configured to sell a second plurality of items via the network; and
    the first network site being further configured to generate a network page in the first network site in association with one of the first plurality of items in response to a request from a client device and present a reference to the second network site to a user in association with a transaction that involves the aspect of the first network site, wherein the reference comprises a link that directs the client device to the second network site, and the first network site is configured to associate a function with the network page that forwards information about the one of the first plurality of items to the second network site upon a manipulation of the link by the user.

3. The system of claim 2, wherein the relationship engine identifies the relationship between the second network site and the aspect of the first network site by searching a data structure in which a plurality of prior determined relationships are stored.

4. The system of claim 2, wherein the relationship engine identifies the relationship between the second network site and the aspect of the first network site by analyzing customer data that describes an interaction of a plurality of customers with the first and second network sites.

5. The system of claim 2, wherein the relationship engine identifies the relationship between the second network site and the aspect of the first network site by identifying a second item that is related to the one of the first plurality of items and that is offered for sale by the second network site.

6. The system of claim 2, wherein the aspect of the first network site comprises an identity of one of the first plurality of items offered for sale via the first network site, and the network page comprises a product detail page for the one of the first plurality of items, where the reference is presented in the product detail page.

7. The system of claim 6, wherein the relationship engine identifies the relationship between the second network site and the aspect of the first network site by determining whether a threshold number of users have contemporaneously viewed the one of the first plurality of items and visited the second network site.

8. The system of claim 2, wherein the aspect of the first network site comprises a category of the first plurality of items offered for sale via the first network site, and the transaction comprises generating a category page associated with the category of the first plurality of items, where the reference is presented in the category page.

9. The system of claim 8, wherein the relationship engine identifies the relationship between the second network site and aspect of the first network site by determining whether a threshold number of users have contemporaneously viewed an item associated with the category and visited the second network site.

10. The system of claim 8, wherein the relationship engine identifies the relationship between the second network site and aspect of the first network site by determining whether a threshold number of users have contemporaneously purchased an item associated with the category on the second network site.

11. The system of claim 2, wherein the aspect of the first network site comprises a brand offered for sale via the first network site, and the transaction comprises generating a search result page presenting a result of a search of the items based upon a search string that identifies the brand, where the reference is presented in the search result page.

12. The system of claim 11, wherein the relationship engine identifies the relationship between the second network site and the aspect of the first network site by determining whether a threshold number of users have contemporaneously viewed the items associated with the brand and visited the second network site.

13. The system of claim 2, wherein the second network site is implemented on the at least one server.

14. A method, comprising:
 implementing a first network site in at least one server that sells a first plurality of items via a network;
 generating a network page in the first network site in association with one of the first plurality of items in response to a request from a client device;
 identifying a relationship in the at least one server between a second network site and an aspect of the first network site by determining whether a threshold number of users for which user activity is tracked in a respective session contemporaneously view one of the first plurality of items and visit the second network site, wherein the second network site is further configured to sell a second plurality of items via the network; and
 presenting a reference to the second network site to a user in association with a transaction that involves the aspect of the first network site, wherein the reference comprises a link that directs the client device to the second network site, and the first network site is configured to associate a function with the network page that forwards information about the one of the first plurality of items to the second network site upon a manipulation of the link by the user.

15. The method of claim 14, wherein the aspect of the first network site comprises an identity of one of the first plurality of items offered for sale via the first network site, wherein the network page comprises a product detail page for the one of the first plurality of items in response to a request from a client, wherein the reference is presented in the product detail page.

16. The method of claim 15, wherein identifying the relationship in the at least one server between the second network site and the aspect of the first network site further comprises determining whether a threshold number of users have contemporaneously viewed the one of the first plurality of items and visited the second network site.

17. The method of claim 15, wherein identifying the relationship in the at least one server between the second network site and the aspect of the first network site further comprises determining whether a threshold number of users have contemporaneously purchased the one of the first plurality of items and visited the second network site.

18. The method of claim 14, wherein the aspect of the first network site comprises a category of the items offered for sale via the first network site, wherein the transaction comprises generating a category page associated with the category of the items, where the reference is presented in the category page.

19. The method of claim 18, wherein identifying the relationship in the at least one server between the second network site and the aspect of the first network site comprises:
 determining whether a threshold number of users have contemporaneously viewed an item associated with the category and visited the second network site.

20. The method of claim 18, wherein identifying the relationship in the at least one server between the second network site and the aspect of the first network site further comprises:
 determining whether a threshold number of users have contemporaneously purchased an item associated with the category on the second network site.

21. The method of claim 18, further comprising associating a function with the category page that forwards information about the category to the second network site upon a manipulation of the link by a user.

22. The method of claim 14, wherein the aspect of the first network site comprises a brand offered for sale via the first network site, and the transaction comprises generating a search result page presenting a result of a search of the items based upon a search string that identifies the brand, where the reference is presented in the search result page.

23. The method of claim 22, wherein identifying the relationship in the at least one server between the second network site and the aspect of the first network site further comprises determining whether a threshold number of users have contemporaneously viewed the items associated with the brand and visited the second network site.

* * * * *